No. 878,015. PATENTED FEB. 4, 1908.
J. K. PARKER.
TUBULAR METALLIC SPRING TIRE.
APPLICATION FILED DEC. 12, 1906.
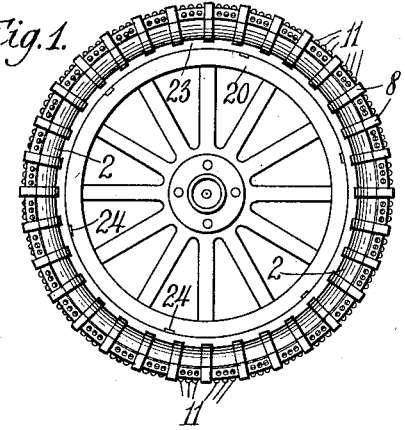
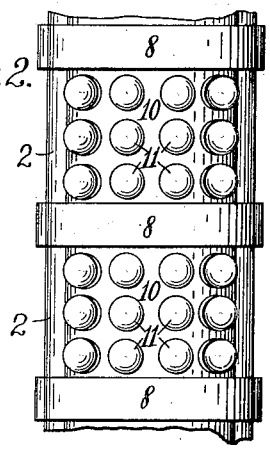
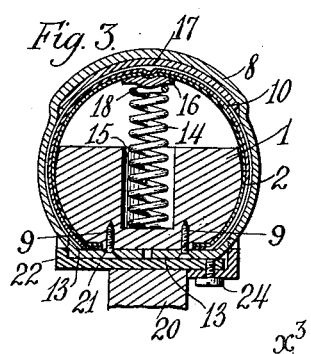
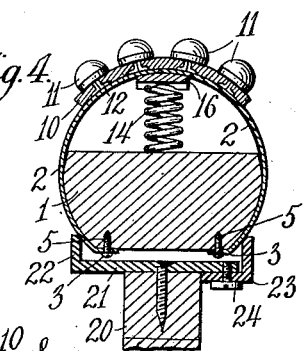
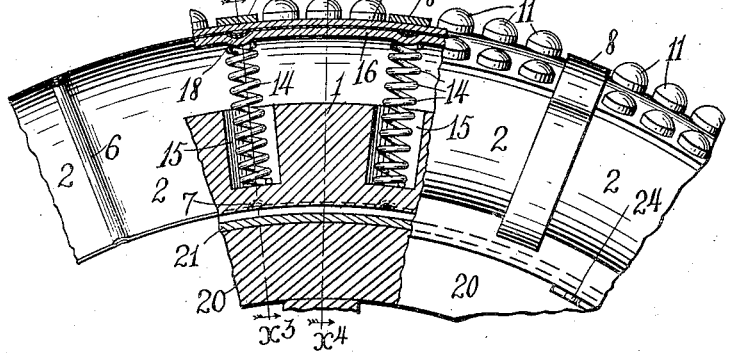
Witnesses
W. E. Allen
R. W. Bishop
Inventor
James Knowles Parker
By Townsend, Lyon, Hackley & Knight
Attorneys

UNITED STATES PATENT OFFICE.

JAMES KNOWLES PARKER, OF LONGBEACH, CALIFORNIA.

TUBULAR METALLIC SPRING-TIRE.

No. 878,015.     Specification of Letters Patent.     Patented Feb. 4, 1908.

Application filed December 12, 1906. Serial No. 347,554.

*To all whom it may concern:*

Be it known that I, JAMES KNOWLES PARKER, a subject of the King of the United Kingdom of Great Britain and Ireland, residing at Longbeach, in the county of Los Angeles, State of California, have invented a new and useful Tubular Metallic Spring-Tire, of which the following is a specification.

The main object of the present invention is to provide a spring tire for automobiles or other vehicles which will be of great durability and strength in proportion to the cost and weight thereof.

Another object of the invention is to provide a tire of this character in which the spring parts will be substantially protected from dust and dirt.

Another object of the invention is to provide a tire of this character in which the parts can be readily assembled or repaired, or the parts subject to wear renewed.

Another object is to provide a tire of this character with means for increasing the traction or grip of the tire on the road-way.

In the accompanying drawings:—Figure 1 is a side elevation of an automobile or other vehicle wheel provided with my improved tire. Fig. 2 is a plan of part of the tire. Fig. 3 is a transverse section of the tire on the line $x^3$ in Fig. 5. Fig. 4 is a transverse section on line $x^4$ in Fig. 5. Fig. 5 is a vertical section through a portion of the tire, in the plane transverse to the axis of the wheel.

The tire comprises a core or rim body 1 constructed or built up of wood or other suitable material in the form of a ring having rounded sides, and a tubular shell secured to said core ring and forming the main elastic member of the tire. Said shell is composed of a plurality or series of tubular shell sections 2, each such section being circular in transverse cross-section so that it will fit around and on each side of the core ring, sufficient space being, however left between the outer face of the core ring and the inner face of these sections to permit inward flexure of the sections. Each section 2 is open or split at its inner face and terminates in flanges 3 to engage shoulders 4 on the core ring 1, said flanges being secured to said shoulders by screws 5. Each tubular section 2 is crimped or beaded at one end to form an annular depression or channel 6, and at the other end is similarly crimped to form a channel 7 adapted to rest in the channel 6 of the adjacent tubular section, so that when the tubular sections are placed end to end on and around the core ring they are interlocked by means of these crimped portions, thereby more effectually resisting strain and at the same time excluding dust. At these joints of the tubular sections are provided straps 8 of steel or other suitable material formed to fit around the said tubular sections at the joint and extending in under the core ring 1, the said straps being fastened to the core ring by screws 9 engaging in these inwardly extending portions 13. To take the wear of travel and increase the traction, armor means is provided consisting of a leather or other suitable strip 10 extending around the tubular rim and underneath the straps 8, and provided with buttons or plates 11 secured thereto as by rivets or clenches, indicated at 12. At each of these joints internal elastic means is provided for reinforcing the strength and elasticity of the tire, said means consisting of a spring 14 seated in a recess 15 in the core ring 1, and bearing at its outer end against an elastic band or bearing plate 16, of steel or other metal which bears against and within the tubular sections 2 and holds them in proper relative positions. To hold the parts in proper relative positions, the tubular sections at this point of pressure are indented as at 17 to engage a corresponding indentation or depression 18 in the bearing plate 16.

The above described tire can be manufactured and sold as such, and can be attached to a vehicle as follows:—The wooden wheel rim 20 is provided with an annular metal rim 21 in the form of a flat ring attached to fit more or less closely within the strap ring extensions 13. At one side, this metallic rim 21 is provided with a flange 22, and at its other side is provided a movable flanged member 23 detachably secured thereto by screws 24, so that the assembled tire can be slipped on the metallic rim 21 and the detachable flange member 23 can then be put in place and secured by its screws, the flanges on the members 21, 23 then engaging with the strap members 8 to hold the tire firmly in place without interfering with the elasticity thereof. The flanges are notched to receive the straps and fit against the tubular rim sections.

The core ring 1 is perferably cut away or rounded at its upper portion above the center of curvature thereof, to permit of proper yielding of the tubular sections, but at its inner portion it fits the tubular sections closely, so as to take the pressure of clamping means 22, 23.

In operation, the tire yields to the pressure due to the weight of the vehicle, each tubular section yielding inwardly and bulging laterally in a continuous and uniform manner around the tire, so that a smooth action is secured. The straps 8 also yield in the same manner and the internal springs serve to reinforce the resisting action of the elastic tire sections and of the straps, the action being similar to that of the pneumatic tire and having also the same advantage of protection of the internal parts from dust and dirt.

The construction also presents the advantage of a strong traction grip due to the presence of the straps and the projections on the armor strip. It will be noted that the wear comes substantially altogether on the armor, and when this is worn out it can be removed and replaced at small cost, the main or body portion of the tire remaining substantially unaffected and being unsubjected to wear. The tire as a whole will, therefore, last substantially as long as the vehicle.

What I claim is:—

1. A vehicle wheel tire comprising a rim body, a sectional tubular elastic metal tire secured thereon, and springs within the sections and bearing outwardly thereon, said springs extending between the rim body and the metallic tire sections.

2. A vehicle wheel tire comprising a rim body, a sectional tubular elastic metal tire secured thereon, and straps secured to the rim body and extending over the joints between the sections.

3. A vehicle wheel tire comprising a rim body, a sectional tubular elastic metal tire secured thereon, straps secured to the rim body and extending over the joints between the sections, and armor means formed as a band extending under the said straps and over the tubular sections.

4. A vehicle wheel tire comprising a rim body, a sectional tubular elastic metal tire secured thereon, straps secured to the rim body and extending over the joints between the sections, springs within the sections pressing outwardly thereon, armor means formed as a band extending under the said straps and over the tubular sections, the ends of the tubular sections having interengaging channel portions.

5. A vehicle wheel tire comprising a rim body formed as a core ring, and a tubular sectional metallic tire partly surrounding the rim body but having its outer portion separated therefrom, in combination with a wheel rim provided with clamping means engaging the exterior of said metallic sectional tire and pressing the same against the core ring.

6. A vehicle wheel tire comprising a rim body, a sectional tubular elastic metal tire secured thereon, said sections interengaging at their joints, an elastic metal band within and bearing outwardly against the sections, said band and sections having interengaging portions and springs extending between the core ring and the band to press the band outwardly.

7. A vehicle tire comprising a rim body and a sectional tubular elastic metal tire secured thereon, the sections of said tire being crimped to form channels fitting on one another, whereby the sections are caused to engage and interlock one another at their joints.

In testimony whereof, I have hereunto set my hand at Los Angeles, California, this 5th day of December, 1906.

JAMES KNOWLES PARKER.

In presence of—
ARTHUR P. KNIGHT,
FRANK L. A. GRAHAM.